(12) United States Patent
Cox et al.

(10) Patent No.: US 10,439,513 B2
(45) Date of Patent: Oct. 8, 2019

(54) SYSTEMS AND METHODS FOR SYNCHRONIZING CONVERTER MODULES

(71) Applicants: Robert Williams Cox, Charlotte, NC (US); Daniel Wade Evans, Charlotte, NC (US)

(72) Inventors: Robert Williams Cox, Charlotte, NC (US); Daniel Wade Evans, Charlotte, NC (US)

(73) Assignees: SINEWATTS, INC., Charlotte, NC (US); THE UNIVERSITY OF NORTH CAROLINA AT CHARLOTTE, Charlotte, NC (US)

(*) Notice: Subject to any disclaimer, the term of this patent is extended or adjusted under 35 U.S.C. 154(b) by 43 days.

(21) Appl. No.: 15/528,127

(22) PCT Filed: Dec. 18, 2015

(86) PCT No.: PCT/US2015/066773
§ 371 (c)(1),
(2) Date: May 19, 2017

(87) PCT Pub. No.: WO2016/100865
PCT Pub. Date: Jun. 23, 2016

(65) Prior Publication Data
US 2018/0323725 A1    Nov. 8, 2018

Related U.S. Application Data

(60) Provisional application No. 62/102,146, filed on Jan. 12, 2015, provisional application No. 62/094,400, filed on Dec. 19, 2014.

(51) Int. Cl.
| | | |
|---|---|---|
| *H02M 1/00* | (2006.01) | |
| *H02M 7/49* | (2007.01) | |
| *H02M 1/088* | (2006.01) | |
| *H02M 3/28* | (2006.01) | |
| *H02M 3/335* | (2006.01) | |
| *H02M 7/493* | (2007.01) | |

(Continued)

(52) U.S. Cl.
CPC .......... *H02M 7/49* (2013.01); *H02M 1/088* (2013.01); *H02M 3/285* (2013.01);
(Continued)

(58) Field of Classification Search
CPC ......... H02M 2001/0077; H02M 1/088; H02M 7/501
(Continued)

(56) References Cited

U.S. PATENT DOCUMENTS

| | | | |
|---|---|---|---|
| 4,510,399 A | | 4/1985 | Baker |
| 5,070,440 A | * | 12/1991 | Walker .................... H02M 7/49 363/137 |

(Continued)

OTHER PUBLICATIONS

International Search Report for International Application No. PCT/US2015/066773, dated Apr. 19, 2016.

(Continued)

Primary Examiner — Alex Torres-Rivera
(74) Attorney, Agent, or Firm — K&L Gates LLP

(57) ABSTRACT

Various examples are directed to a converter system comprising first and second series-connected converter modules and a synchronization circuit. The synchronization circuit may modulate a reference signal onto a carrier signal to generate a synchronization current signal and the synchronization current signal to an output current of the converter system to generate an aggregated output current. A first converter module may receive the aggregated output current from a first current sensor and generate a first reproduced synchronization signal at least in part from the aggregated output current. A first switch control signal for switching at least one switch at the first converter may be generated based at least in part on the first reproduced synchronization signal.

22 Claims, 12 Drawing Sheets

(51) Int. Cl.
  *H02M 7/5383* (2007.01)
  *H02M 7/5395* (2006.01)
(52) U.S. Cl.
  CPC ....... *H02M 3/33569* (2013.01); *H02M 7/493* (2013.01); *H02M 7/5383* (2013.01); *H02M 7/5395* (2013.01); *H02M 2001/0077* (2013.01)
(58) Field of Classification Search
  USPC .................................................... 363/65, 71
  See application file for complete search history.

(56) References Cited

U.S. PATENT DOCUMENTS

| 6,148,187 | A | 11/2000 | Chiba |
| 8,009,449 | B2 | 8/2011 | Yuan et al. |
| 2005/0135031 | A1 | 6/2005 | Colby et al. |
| 2008/0061948 | A1* | 3/2008 | Perez ................... G05B 19/042 340/12.32 |
| 2009/0302686 | A1* | 12/2009 | Fishman ................ H02M 7/49 307/82 |
| 2012/0091817 | A1 | 4/2012 | Seymour et al. |
| 2013/0181527 | A1 | 7/2013 | Bhowmik |
| 2014/0169053 | A1* | 6/2014 | Ilic .................... H02M 7/53873 363/132 |
| 2014/0306533 | A1* | 10/2014 | Paquin ................... H02J 3/383 307/52 |

OTHER PUBLICATIONS

Written Opinion of the International Searching Authority for International Application No. PCT/US2015/066773, dated Apr. 19, 2016.

* cited by examiner

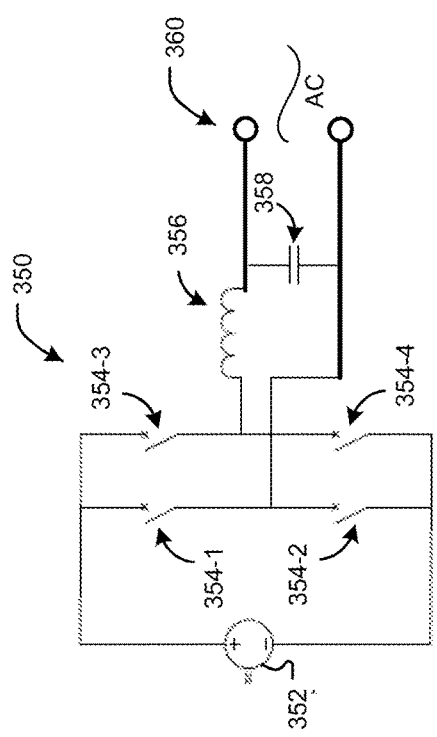
FIG. 10
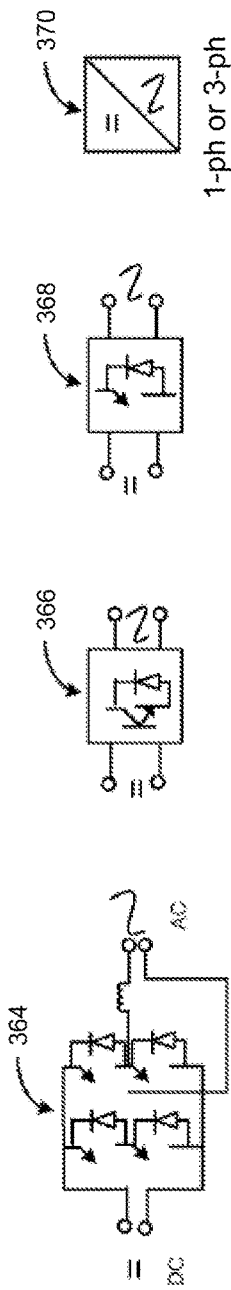
FIG. 11
FIG. 12
FIG. 13
FIG. 14

Load Center/Termination Box
Grid Interface @ 480, 3-ph

SYSTEMS AND METHODS FOR SYNCHRONIZING CONVERTER MODULES

PRIORITY

This application claims the benefit of U.S. Provisional Application Ser. No. 62/094,400, filed on Dec. 19, 2014, entitled CURRENT-BASED METHODOLOGY FOR POWERLINE COMMUNICATIONS AND SYNCHRONIZATION OF REMOTE PHOTOVOLTAIC AND/OR ENERGY STORAGE MODULES, which is incorporated herein by reference in its entirety. This application also claims the benefit of U.S. Provisional Application Ser. No. 62/102,146, filed on Jan. 12, 2015, entitled CURRENT-BASED METHODOLOGY FOR POWERLINE COMMUNICATIONS AND SYNCHRONIZATION OF REMOTE PHOTOVOLTAIC AND/OR ENERGY STORAGE MODULES, which is also incorporated herein by reference in its entirety.

GOVERNMENT SUPPORT DISCLAIMER

This invention was made, at least in part, with government support under Award Numbers DE-EE0006859 and DE-EE0006692 awarded by the Department of Energy. The Government has certain rights in the invention.

GOVERNMENT SUPPORT DISCLAIMER

The information, data, or work presented herein was funded in part by an agency of the United States Government. Neither the United States Government nor any agency thereof, nor any of their employees, makes any warranty, express or implied, or assumes any legal liability or responsibility for the accuracy, completeness, or usefulness of any information, apparatus, product, or process disclosed, or represents that its use would not infringe privately owned rights. Reference herein to any specific commercial product, process, or service by trade name, trademark, manufacturer, or otherwise does not necessarily constitute or imply its endorsement, recommendation, or favoring by the United States Government or any agency thereof. The views and opinions of authors expressed herein do not necessarily state or reflect those of the United States Government or any agency thereof.

BACKGROUND

Converters are devices used to convert electricity from one form to another. Converters include direct current (DC) to DC converters, and DC to alternating current (AC) converters, also referred to as inverters. DC-to-DC converters are used to modify the voltage, current and/or power of an input DC signal relative to an output DC signal. For example, step-up converters, such as boost converters, receive an input DC voltage and provide a higher output DC voltage. Step-down converters, such as buck converters, receive an input DC voltage and provide a lower output DC voltage. DC-to-DC converters are used in many types of equipment including, for example, in power supplies to modify and/or condition power provided to DC loads such as, for example, computers, mobile phones and other mobile computing devices, etc. DC-to-AC inverters receive a DC input voltage and provide an AC output voltage. Inverters are also used in many contexts where a DC source is used to power an AC load. For example, inverters are commonly used to couple batteries, photovoltaic panels, fuel cells, and other similar sources to the AC electrical grid. Switched-mode converters convert electricity utilizing one or more switches (e.g., transistors) in conjunction with one or more passive components, such as capacitors or inductors. The switch is periodically cycled between an open position and a closed position. Characteristics of the converter output are varied by modifying the duty cycle of the switch. When multiple converter modules are connected to the electrical grid, the modules may need some means for communication in order to share information or to coordinate operation. Various communications schemes have been used, i.e. wireless and power-line carrier (PLC) schemes.

BRIEF DESCRIPTION OF DRAWINGS

FIGS. 10-14 are diagrams showing example of a circuit configuration for an inverter module that may be used, for example, as one or more of the inverter modules.

DETAILED DESCRIPTION

Various examples described herein are directed to systems and methods for synchronizing converter modules in a converter system. In switched-mode converter systems with multiple converter modules, each converter module may receive a direct current (DC) input and provide a DC or alternating current (AC) output. Converter modules may be separately switched according to separate switch control signals. A synchronization current signal may be provided to the converter modules to synchronize the switching at the modules. The switching of the modules may be synchronized in any suitable manner. In some examples, switch control signals may be equivalent (e.g., may have the same phase and frequency) or have a predetermined relationship to one another (e.g., a specified phase offset, etc.)

In some examples, the synchronization current signal may be added to a converter system current, where it may be sensed by the individual converter modules. One or more converter modules may comprise a current sensor, such as a current-mode transformer, that is positioned to receive the synchronization current signal. The converter modules may utilize the synchronization current signal to adjust the frequency and/or phase of their own switch control signals. For series connected, converter modules the synchronizing current signal may allow coordination of the switching at the various modules, which may improve the operation of the converter system. In some examples, the synchronizing current may be based on zero-crossings of an output current, an output voltage, or any combination of harmonics of output current or voltage.

In some examples, using a synchronization current signal may alleviate disadvantages associated with adding a synchronization voltage signal to a voltage at the converter system output. For example, when the converter modules are connected in series, the voltage at the converter system output may be a sum of the individual output voltages of the respective modules. As a result, a synchronization voltage signal would be divided among the series-connected modules so that the magnitude of the synchronization voltage signal at each individual module is less than the original voltage of the voltage signal. This may result in non-optimal signal to noise ratio and compromise the ability of each converter module to accurately detect the synchronizing event.

Figure 1:
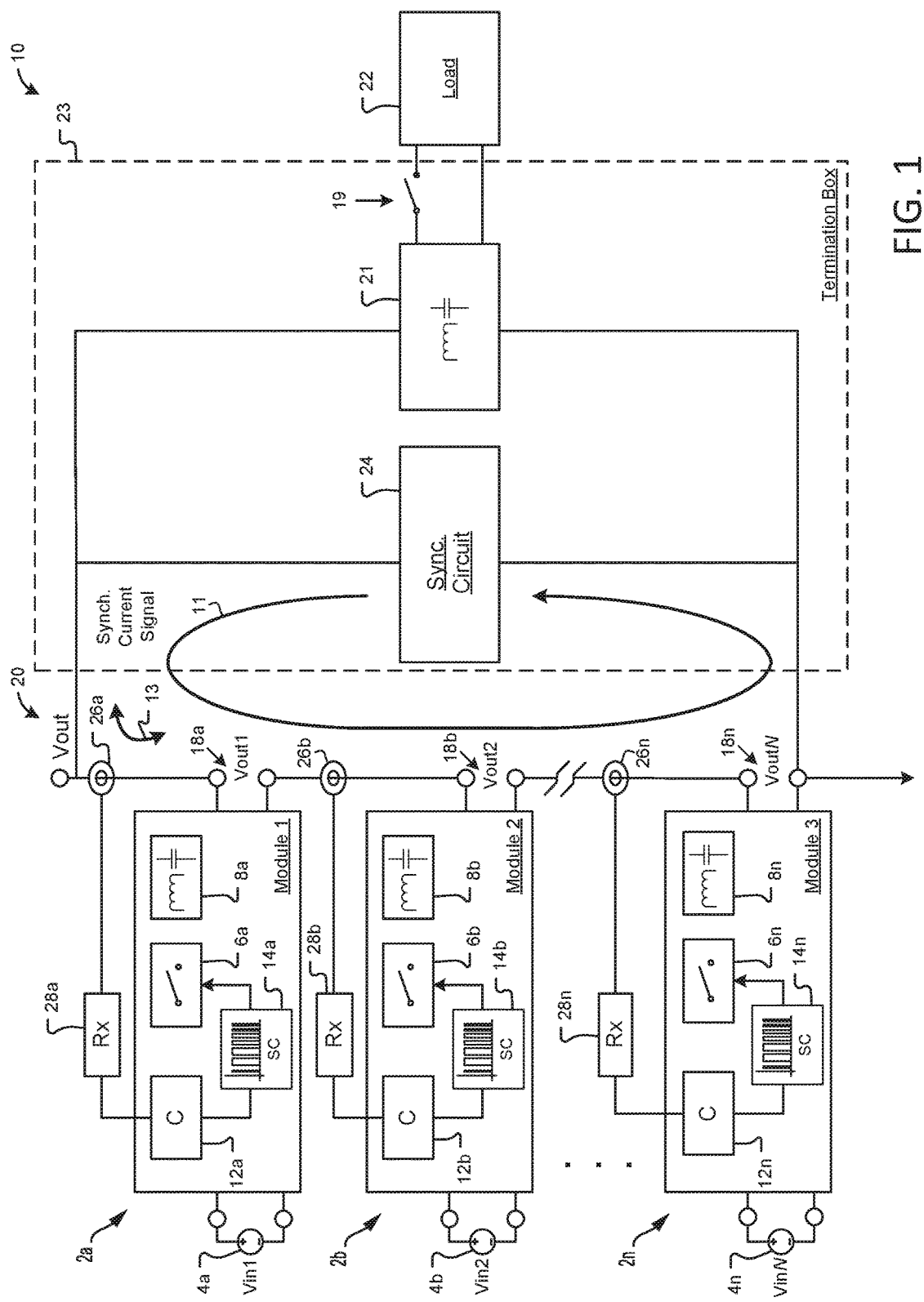
FIG. 1 is a diagram showing one example of a converter system utilizing a synchronization current signal to synchronize converter modules.

FIG. 1 is a diagram showing one example of a converter system 10 utilizing a synchronization current signal to synchronize converter modules 2a, 2b, 2n. The converter system 10 comprises three converter modules 2a, 2b, 2n electrically coupled in series, although any suitable number of series-coupled converter modules may be used. Converter modules 2a, 2b, 2n may receive respective DC inputs from DC sources 4a, 4b, 4n. The DC sources 4a, 4b, 4n may include any suitable source or sources such as, for example, one or more batteries, one or more photovoltaic sources, one or more fuel cells, one or more wind mills, one or more internal combustion engines, one or more geothermal elements, etc. Each converter module 2a, 2b, 2n may generate an output 18a, 18b, 18n. The module output voltages 18a, 18b, 18n may be DC or AC. For example, when the converter system 10 is a DC-to-AC inverter, the outputs 18a, 18b, 18n may be AC. In some examples, because the converter modules 2a, 2b, 2n are connected in series, the voltage at the output 20 of the converter system 10 is a sum of the voltages 18a, 18b, 18n of the respective converter modules 2a, 2b, 2n. The output 20, in some examples, may be coupled to a load. For example, in addition to the converter system 10, FIG. 1 also shows a load 22 electrically coupled to the converter system 10. The load 22 may be any suitable load such as, for example, an electrical grid network (FIG. 2), an AC and/or DC appliance, etc.

Each of the converter modules 2a, 2b, 2n may comprise one or more switches 6a, 6b, 6n, one or more passive components 8a, 8b, 8n and a module control circuit 12a, 12b, 12c. Switches 6a, 6b, 6n may include any suitable type of switch such as, for example, one or more field-effect transistors (FETs) of any suitable fabrication technology, (e.g., power metal oxide semiconductor FET (MOSFET) complimentary metal oxide semiconductor (CMOS) FETs for low voltage applications, etc.). Other examples of switches 6a, 6b, 6c that may be used include bipolar junction transistors (BJTs), insulated gate bipolar transistors (IGBTs), Silicon Carbide junction gate FET (SiC JFET), Gallium Nitride High Electron Mobility Transistor (GaN HEMT) and any other similar switching devices suitable for switching power applications. Passive components 8a, 8b, 8n may include capacitive components (e.g., one or more capacitors) and/or inductive components (e.g. one or more inductors). In some examples, passive components 8a, 8b, 8n may be or include discrete components or realized, in whole or in party, by printed circuit board (PCB) embedded inductors or capacitors. In some examples, passive components 8a, 8b, 8n may be realized in whole or in part from other components of the circuitry of the converter modules 2a, 2b, 2n. For example, appropriately-utilized parasitic inductance and/or capacitance from components in the converter modules 2a, 2b, 2n may be sufficient, in some examples, to reduce high-frequency emissions below threshold levels. Some examples of converter modules 2a, 2b, 2n may include additional components (not shown). Also, the configuration of components 6a, 6b, 6n, 8a, 8b, 8n, 12a, 12b, 12n and optional additional components in various examples may vary for different types of switched converters.

The control circuits, 12a, 12b, 12n may generate switch control signals 14a, 14b, 14n for the respective converter modules 2a, 2b, 2n. Switch control signals 14a, 14b, 14n may be binary signals that are either asserted (indicating that the respective switches 6a, 6b, 6n are to be closed) or un-asserted (indicating that the respective switches 6a, 6b, 6n are to be opened). Switch control signals 14a, 14b, 14n may be generated in any suitable manner. Switch control signals 14a, 14b, 14n may be pulse width modulated (PWM) to control the value of the respective outputs 18a, 18b, 18n. For example, the control circuits 12a, 12b, 12n may be configured to modify a duty cycle of the respective switch control signals 14a, 14b, 14n based on feedback from the respective outputs 18a, 18b, 18n (and/or system output 20). Converter modules 2a, 2b, 2n may be voltage-controlled or current-controlled. In voltage-controlled converter modules, the control circuit 12a, 12b, 12n may generate the switch control signal 14a, 14b, 14n based on the feedback to drive the output 18a, 18b, 18n to a constant voltage. In current-controlled converter modules, the control circuit 12a, 12b, 12n may generate the switch control signal 14a, 14b, 14n to maintain the output 18a, 18b, 18n at a constant current.

A synchronization control circuit 24 may be positioned to provide a synchronization current signal 11 to the modules 2a, 2b, 2n. For example, the synchronization control circuit 24 may be coupled in parallel with the modules 2a, 2b, 2n and the load 22. In some examples, the synchronization control circuit 24 may be physically positioned at a termination box 23 that includes various other components for connecting the converter system 10 to the load 22, as described in more detail below. The synchronization control circuit 24 may add the synchronization control current 11 to an output current 13 of the converter system 10. In some examples including a termination box 23, the termination box 23 may also include passive components 21 that may be part of a grid connection filter (FIG. 15) and/or a switch 19. The switch 19 may be utilized to alternately connect and disconnect the converter system 10 from the load 22.

In some examples, the synchronization current signal 11 may be a periodic signal that the modules 2a, 2b, 2n utilize to synchronize their respective switch control signals 14a, 14b, 14n to one another. For example, although the control circuits 12a, 12b, 12n may vary the duty cycles of the respective switch control signals 14a, 14b, 14n, the phase and/or frequency of the control signals 14a, 14b, 14n may be maintained to have a predetermined relationship to the synchronization current signal 11. For example, one or more of the switch control signals 14a, 14b, 14n may be substantially in phase with the synchronization current signal 11.

The synchronization current signal 11 may track any suitable reference signal. In some examples (e.g., examples where the converter is a DC-to-DC converter), the synchronization control circuit 24 may generate the synchronization current signal 11 to track any other periodic source such as, for example, a quartz or other oscillator, etc. Also, in some examples where the converter system 10 is a DC-to-AC inverter system providing power to an electrical grid network, the synchronization control circuit 24 may generate the synchronization current signal 11 to track the frequency and/or phase of the grid signal on the electrical grid networks. For example, as described in more detail herein, the reference signal may be a pulse signal with pulses corresponding to zero-crossings of the grid signal. The grid signal tracked by the synchronization current signal 11 may be any suitable signal or combination of signals occurring on the grid. For example, the grid signal may be a fundamental grid voltage, a fundamental grid current, preferred harmonics, or any combination thereof.

Although the synchronization current 11 is shown to flow counter-clockwise in the configuration of FIG. 1, it may be in any suitable direction. Also, because synchronization control circuit 24 is in parallel with the load 22 and the modules 2a, 2b, 2n, some portion of the synchronization current signal 11 may also be provided to the load 22. In some examples, however, the impedance of the load 22 may be higher than the impedance of the modules 2a, 2b, 2n. As a result, most of the synchronization current 11 may be provided to the modules 2a, 2b, 2n and not to the load 22 thereby increasing the synchronizing signal content for the converter modules.

The modules 2a, 2b, 2n may comprise components for receiving and demodulating the synchronization current signal 11. For example, the modules 2a, 2b, 2n may comprise current mode transformers 26a, 26b, 26n positioned to sense an aggregated current at the output 20. Although current mode transformers 26a, 26b, 26n are shown in FIG. 1, any suitable current sensing device may be used, such as, for example, Hall effect sensors, etc. The aggregated current may include a sum of current generated by the modules 2a, 2b, 2n (e.g., output current 13) and the synchronization current signal 11. Current mode transformers 26a, 26b, 26n may generate an analog signal representing the aggregated current. Demodulation circuits 28a, 28b, 28n may receive the analog signals from the current mode transformers 26a, 26b, 26n and extract respective synchronizing instants for synthesizing synchronized reference signals for the converter modules, which may correspond to the reference signal used by the synchronization circuit 24 to generate the synchronization signal 11. The converter modules 2a, 2b, 2n utilize their respective reference signal in their respective control circuits 12a, 12b, 12n, to generate their respective switch control signals 14a, 14b, 14n.

The various components of the converter system 10 may be implemented using any suitable type of hardware. In some examples, the synchronization control circuit 24 and/or the various control circuits 12a, 12b, 12n may comprise one or more processors and associated volatile and/or nonvolatile data storage or other computing device components. For example, the synchronization control circuit 24 and/or the various control circuits 12a, 12b, 12n may comprise a Digital Signal Processor (DSP). In addition to or instead of a processor and computing device components, the system controller 14 and various control circuits 12a, 12b, 12n may include any other suitable hardware such as, for example, operational amplifiers, comparators, discrete transistor based amplifiers, filters, logic gates, etc.

Figure 2:
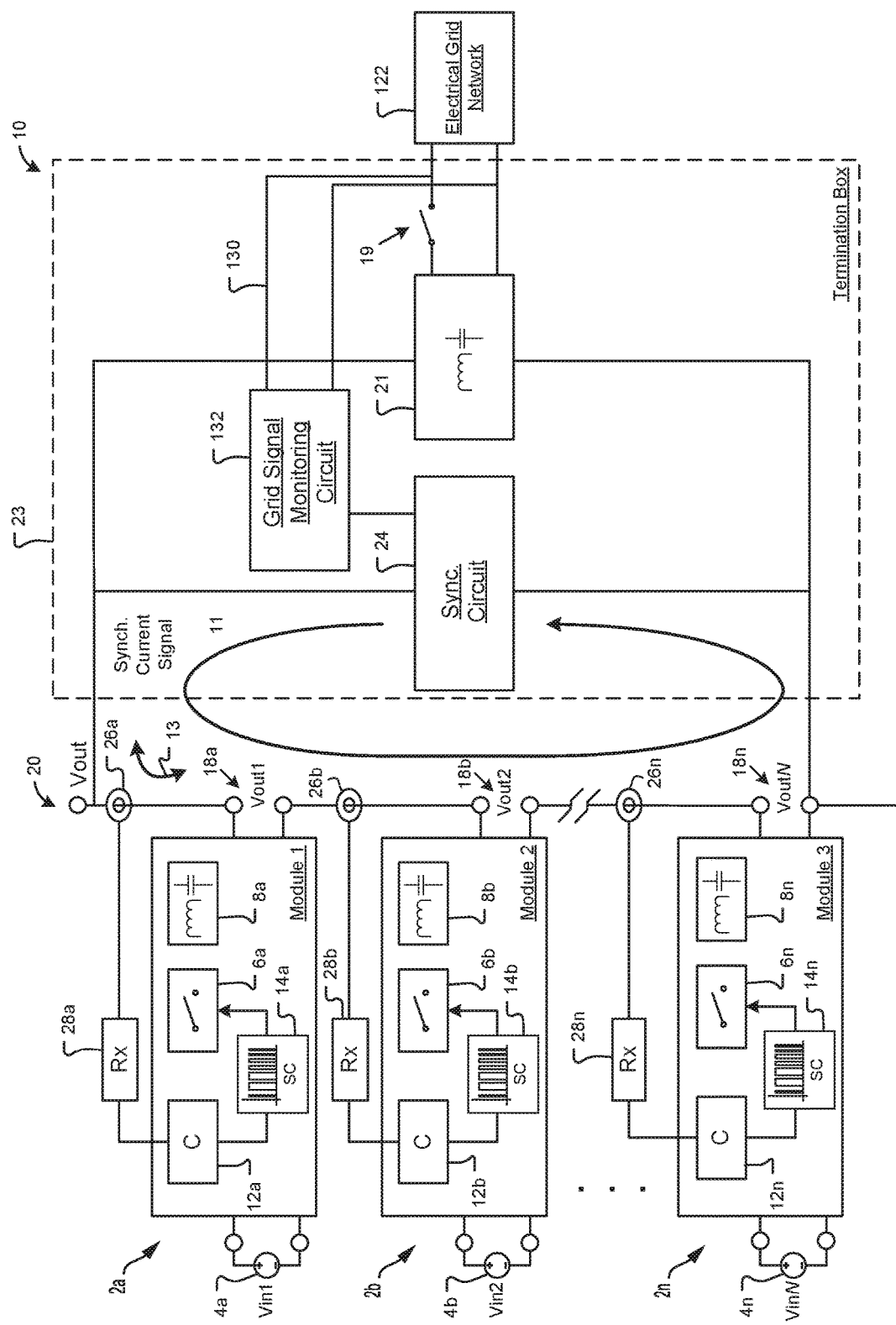
FIG. 2 is a diagram showing one example of the converter system of FIG. 1 arranged as a DC-to-AC inverter system for providing power to an electrical grid network.

FIG. 2 is a diagram showing one example of the converter system 10 of FIG. 1 arranged as a DC-to-AC inverter system for providing power to an electrical grid network 122. In the arrangement shown in FIG. 2, each of the modules 2a, 2b, 2n may be an inverter. Outputs 18a, 18b, 18n may be AC signals. The output 20 of the system 10 may be an AC signal suitable for providing to the electrical grid network 122.

The synchronization circuit 24 may generate the synchronization current signal 11 in any suitable manner. For example, the reference for the synchronization circuit 24 may be provided by the electrical grid network 122. For example, a grid signal 130 on the electrical grid network may be an AC signal having a regular frequency that depends on a type of the electrical grid network 122 (e.g., approximately 60 Hz in the United States, approximately 50 Hz in Europe, etc.). The grid signal 130 may be a voltage or a current of the electrical grid network 122. In some examples, the grid signal 130 may be or include a harmonic (e.g., preferred harmonic) or combination of harmonics (e.g., preferred harmonics) of grid voltage or current.

The grid signal 130 may be provided to a grid signal monitoring circuit 132. An output of the grid signal monitoring circuit 132 may be a pulse signal having pulses in phase with the grid signal 130. The grid signal monitoring circuit 132, in some examples, may be part of the synchronization circuit 24. In some examples, the grid signal monitoring circuit 132 may be or comprise a phase locked loop (PLL) configured to generate the pulse signal having pulses in phase with the grid signal 130. The synchronization circuit 24 may modulate the pulses onto a carrier signal to generate a synchronization signal. A current proportional to the synchronization signal (e.g., the synchronization current signal 11) may be added to a current 13 at the output 20 of the inverter system 10 and provided to the modules 2a, etc. as described herein.

Figure 3:
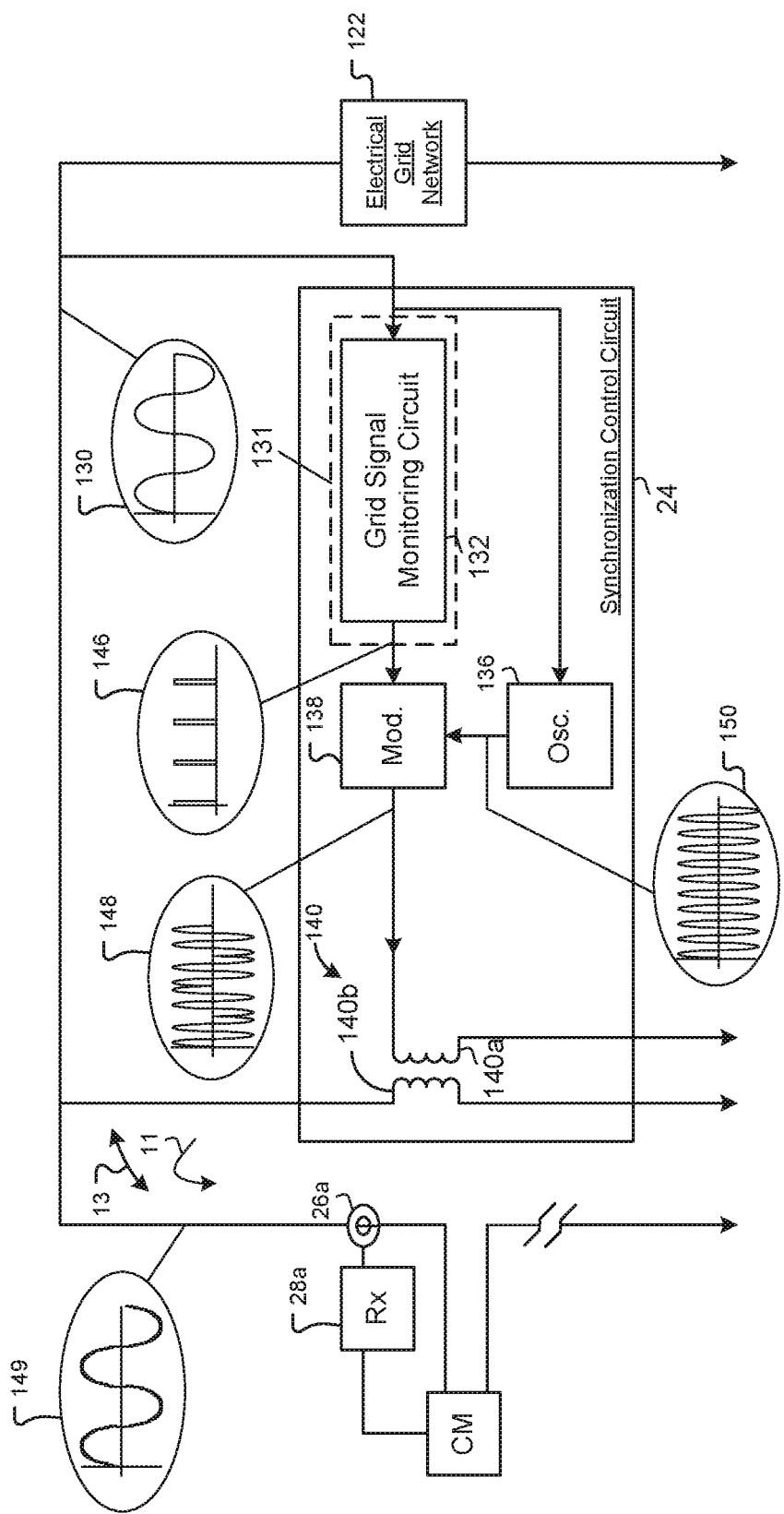
FIG. 3 is a diagram showing an example of the converter system including additional details of the synchronization control circuit.

FIG. 3 is a diagram showing an example of the converter system 10 including additional details of the synchronization control circuit 24. For example, the synchronization control circuit 24 may receive the grid signal 130. The grid signal 130 may be provided to the grid signal monitoring circuit 132. The grid signal 130 is illustrated as a 60 Hz sinusoidal AC signal, although different grids may utilize different signals. In some examples, the synchronization control circuit 24 may comprise various filters or other components (not shown) to condition to the grid signal 130.

The grid signal 130 may be provided to the grid signal monitoring circuit 132. The grid signal monitoring circuit 132 may provide a pulse signal 146 that comprises a train of pulses. Each pulse of the pulse signal 146 may begin at a zero-crossing of the grid signal 130. When the grid signal 130 is a current of the electrical grid network 122, the zero-crossings may be zero-crossings of the current on the electrical grid network 122. When the grid signal 130 is a voltage of the electrical grid network 122, the zero-crossings may be zero-crossings of the voltage on the electrical grid network 122. In some examples, the zero-crossings may be zero-crossings of a combination of grid current and voltage or preferred harmonics thereof. The pulse width of the pulses in the pulse signal 146 may any suitable value. In some examples, the pulses may have a width of 100 microseconds. In some examples, the grid signal monitoring circuit 132 may receive an input signal that is a train of pulses having the predetermined pulse width.

The pulse signal 146 may be provided to a modulator 138. The modulator 138 may also receive a carrier signal 150, which may be generated by an oscillator 136. In some examples, a frequency of the carrier signal 150 may be selected to be higher than a frequency of the grid signal 130. For example, the frequency of the carrier signal 150 may be several orders of magnitude higher than the frequency of the grid signal 130. In one example where the frequency of the grid signal 130 is 60 Hz, the frequency of the carrier signal 150 may be about 110 kHz. In some examples, the frequency of the carrier signal 150 may be between about 10 kHz and about 1 MHz including, for example, 500 kHz. The modulator 138 may modulate the pulse signal 146 onto the carrier signal 150 according to any suitable modulation technique (e.g., frequency modulation, amplitude modulation, phase modulation, etc.). In some examples, the modulator 138 may modulate the pulse signal 146 onto the carrier signal 150 utilizing phase shift keying. For example, during each of the pulses of the pulse signal 146, the modulator 138 may shift a phase of the carrier signal 150 by a predetermined amount. In some examples utilizing binary phase shift keying, the modulator 138 may shift the phase of the carrier signal 150 by 180° ($\pi$ radians).

An output of the modulator 138 may be a synchronization signal 148, which may be a voltage and/or current signal having the pulse signal 146 modulated thereon. The synchronization signal 148 may be provided to a first coil 140*a* of a transformer 140. This may induce a current (e.g., the synchronization current signal 11) in a second coil 140*b* of the transformer, which may be electrically coupled to the electrical grid network 122 and to the modules 2*a*, etc. at the output 20 of the converter system 10. This may add the synchronization current signal 11 to the output current 13. The result is an aggregated output current 149, which may be the sum of the output current 13 and the synchronization current signal 11. The synchronization current signal 11 may be sensed by the modules 2*a*, etc., as described herein.

In some examples, the synchronization control circuit 24 may be configured to vary the amplitude of the synchronization current signal 11 based on the current of the electrical grid network 122. When the grid signal 130 is the current of the electrical grid network 122, the amplitude of the synchronization current signal 11 may vary with the grid signal 130. In some examples, the amplitude of the synchronization current signal 11 may be raised or lowered in proportion to the current load of the electrical load or grid network. For example, raising the amplitude of the synchronization current signal 11 when the current of the electrical grid network 122 rises may raise the synchronization current signal 11 above the noise floor of the modules 2*a*, etc. Also, lowering the amplitude of the synchronization current signal 11 when the current of electrical grid network 122 falls may limit high frequency noise on the electrical grid network 122 and may improve efficiency of the synchronization control circuit 24. To modify the amplitude of the synchronization current signal 11, the synchronization control circuit 24 may modify an amplitude of the carrier signal. For example, the oscillator 136 may receive the grid signal 130 or another indication of grid current and modify an amplitude of the carrier signal 150 in response to changes in the current amplitude on the electrical grid network 122.

The various components of the synchronization control circuit 24 may be analog, digital, or mixed. In some examples, the synchronization control circuit 24 may comprise a processor (e.g., microcontroller, digital signal processor (DSP) or other suitable type of processor) 131. The processor 131 may implement the grid signal monitoring circuit 132, the modulator 138, and/or the oscillator 136. In examples utilizing a processor, the synchronization control circuit 24 may also comprise an analog-to-digital (A/D) converter for sampling and digitizing the grid signal 130 and a digital-to-analog (D/A) converter for converting a digital version of the synchronization signal 148 to analog for provision to the transformer 140. In other examples, the grid voltage zero-cross may be detected utilizing an analog circuit consisting of operational amplifiers and comparator circuits and no digitizing of the grid voltage waveform is required for zero-cross detection.

Figure 4:
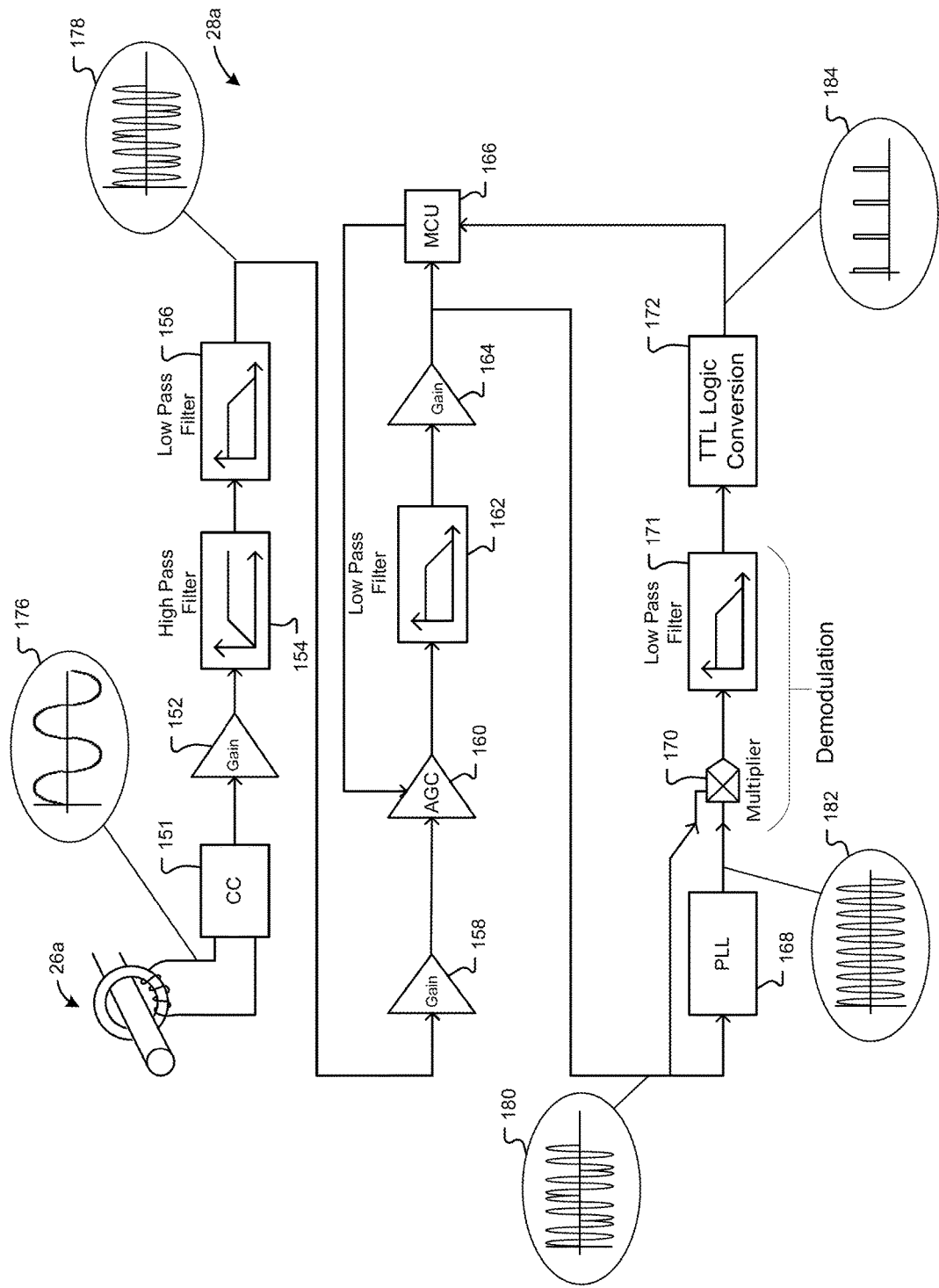
FIG. 4 is a diagram showing one example of a demodulation circuit of the inverter module of FIGS. 2 and 3.

FIG. 4 is a diagram showing one example of a demodulation circuit 28*a* of the module 2*a*, of FIGS. 2 and 3. Also shown is the current mode transformer 26*a*. The current mode transformer 26*a* may be positioned to sense the aggregated output current 149 as shown in FIGS. 2 and 3. The aggregated output current 149 of FIGS. 2 and 3 may induce in the current mode transformer 26*a* a current signal 176 that may be proportional to the aggregated output current 149 of FIGS. 2 and 3. For example, the current signal 176 may correspond to a sum of the synchronization signal 148 and the output current 13.

The demodulation circuit 28*a* of FIGS. 2 and 3 may be configured to extract from the current signal 176 a reproduced pulse signal 184 that may be related to (e.g., equivalent to) the pulse signal 146 of FIG. 3 at the synchronization control circuit 24 of FIGS. 2 and 3. For example, the demodulation circuit 28*a* of FIGS. 2 and 3 may apply various conditioning and filtering to the current signal 176 to generate a modulated synchronization signal 178. In the example of FIG. 4, conditioning components 150 may include various passive components for filtering or otherwise conditioning the current signal 176. In some examples, the components 151 may comprise a resistor for converting the current signal 176 into an equivalent voltage signal. An amplifier 152 may amplify the output of the components 151, for example, by 20 dB. A high pass filter 154 may be selected with a cut-off frequency above the frequency of the grid signal 130 (e.g., greater than 60 Hz). This may filter out the contribution of the grid signal 130 to the current signal 176. A low pass filter 156 may be selected with a cut-off frequency higher than the carrier frequency of the carrier signal 150. For example, the low pass filter 156 may filter high-frequency noise above the carrier frequency. A result of the components 151, 152, 154, 156 may be a synchronization signal 178 that may correspond to the synchronization signal 148 of FIG. 3 at the synchronization control circuit 24 of FIGS. 2 and 3.

As described above, the synchronization control circuit 24 may, in some examples, scale the synchronization signal 148 of FIG. 3 in proportion to the current on the electrical grid network 122. In these examples, the demodulation circuit 28*a* of FIGS. 2 and 3 may be configured to scale the synchronization signal 178 to generate a scaled synchronization signal 180. For example, the synchronization signal 178 may be subjected to additional amplification, such as by an amplifier 158 and an automatic gain control amplifier 160. The gain of the automatic gain control (AGC) amplifier 160 may be modified by a processor 166, which may be, for example, a component of the control circuit of the module 2*a*. The output of the AGC amplifier 160 may be enhanced by additional noise filtering at low pass filter 162 and amplification at an amplifier 164. In some examples, the amplifier 164 may be a 20 dB amplifier. The result may be the scaled synchronization signal 180, which may be provided to the processor 166. For example, as a closed loop implementation, in response to the synchronization signal, the processor 166 may modify the gain of the AGC amplifier 160, for example, to maintain a constant amplitude of the scaled synchronization signal 180.

The scaled synchronization signal 180 may be demodulated to generate the pulse signal 184. (In examples where the synchronization control circuit 24 does not scale the synchronization signal 148 of FIG. 3, the synchronization signal 178 may be demodulated without scaling.) The scaled synchronization signal 180 may be provided to a phase locked loop (PLL) 168, which may include a voltage controlled oscillator. The PLL 168 may generate an output that is phase-locked to the incoming signal. Accordingly, the output of the PLL 168 may be a recreated carrier signal 182. The carrier signal 182 and the scaled synchronization signal 180 may be provided to a multiplier 170. This may demodulate the pulse signal from the carrier signal in examples where the pulse signal is modulated on the carrier signal utilizing binary phase shift keying. When other modulation techniques are used, other types of demodulators may be used. An output of the multiplier may be subjected to optional filtering at low pass filter 171. TTL logic conversion circuit 172 may be utilized to convert the resulting intermediate signal to a digital representation, resulting in the reproduced pulse signal 184 which, in one example, may be utilized for synchronizing the reference waveform of the converter module 2a, of FIGS. 1 and 2. For example, the reproduced pulse signal 184 may comprise 3.3 V pulses lasting 100 ms and corresponding to the zero-crossings of the grid signal 130. In some examples, the pulse widths of pulses in the pulse signal 184 may be varied. For example, the pulse width may be less than one cycle of the grid signal 130. When the grid signal 130 is a 60 Hz grid voltage, then, the pulse width may be less than about 16.67 ms, which is $\frac{1}{60}$ Hz. The controller of the converter module may utilize the reproduced pulse signal 184 to generate a switch control signal for modulating its switches (not shown in FIG. 4).

Figure 5:
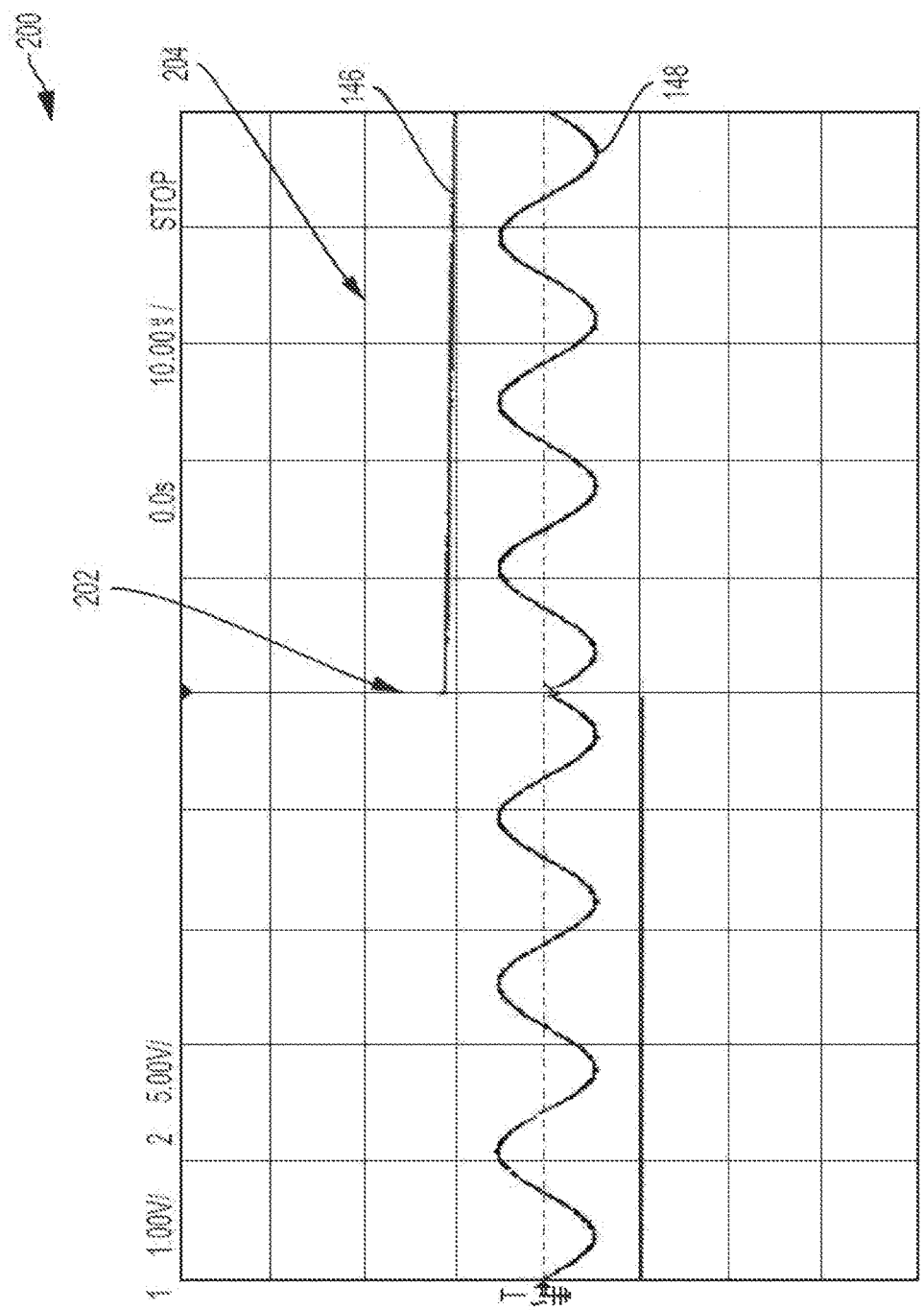
FIG. 5 is a diagram showing one example of the pulse signal and the synchronization signal of FIG. 3.

FIG. 5 is a diagram 200 showing one example of the pulse signal 146 and the synchronization signal 148 of FIG. 3. As described above, the pulse signal 146 may be generated by the grid signal monitoring circuit 132 of the synchronization control circuit 24. At 202, the grid signal 130 (not shown in FIG. 5) may experience a zero crossing. As illustrated, a pulse 204 of the pulse signal 146 begins at 202 (e.g., the zero crossing). The pulse 202 does not end in FIG. 5 and may conclude, for example, at a time outside the scale shown in FIG. 5. When the pulse 204 begins, the phase of the synchronization signal 148 is shown to shift. In the example of FIG. 5, the shift is by 180° (π radians).

Figure 6:
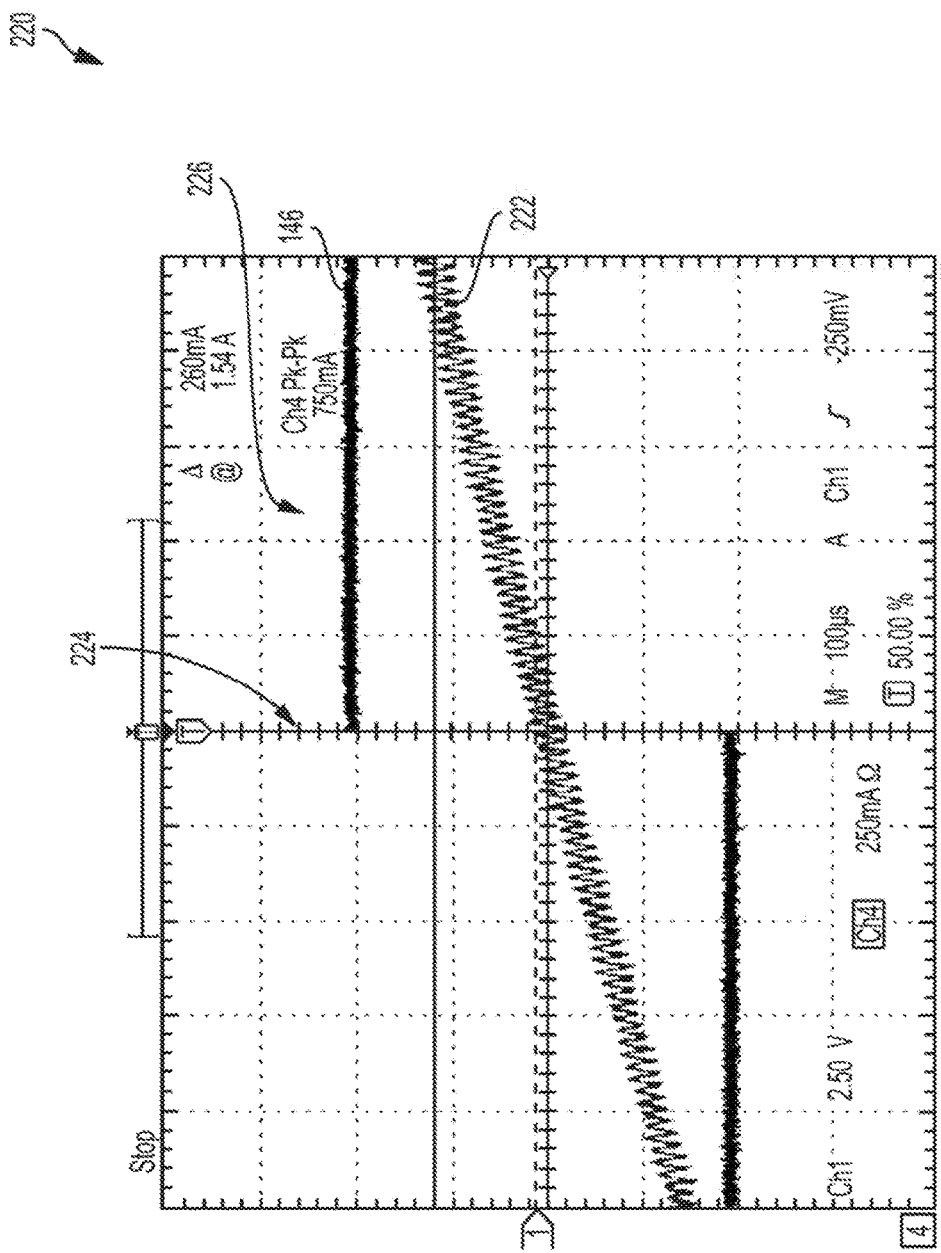
FIG. 6 is a diagram showing one example of the pulse signal and a signal that is the sum of the current output of the inverter system and the synchronization current signal.

FIG. 6 is a diagram 220 showing one example of the pulse signal 146 and a signal 222 that is the sum of the current output 20 of the inverter system 100 and the synchronization current signal 11. As shown, the higher-frequency synchronization current signal 11 is positioned additively on top of the lower-frequency (e.g., 60 Hz) output 20. The phase of the synchronization current signal 11 may change at point 224, which may correspond to a zero crossing of the grid signal 130 (not shown) and a beginning of a pulse 226 in the pulse signal 146.

Figure 7:
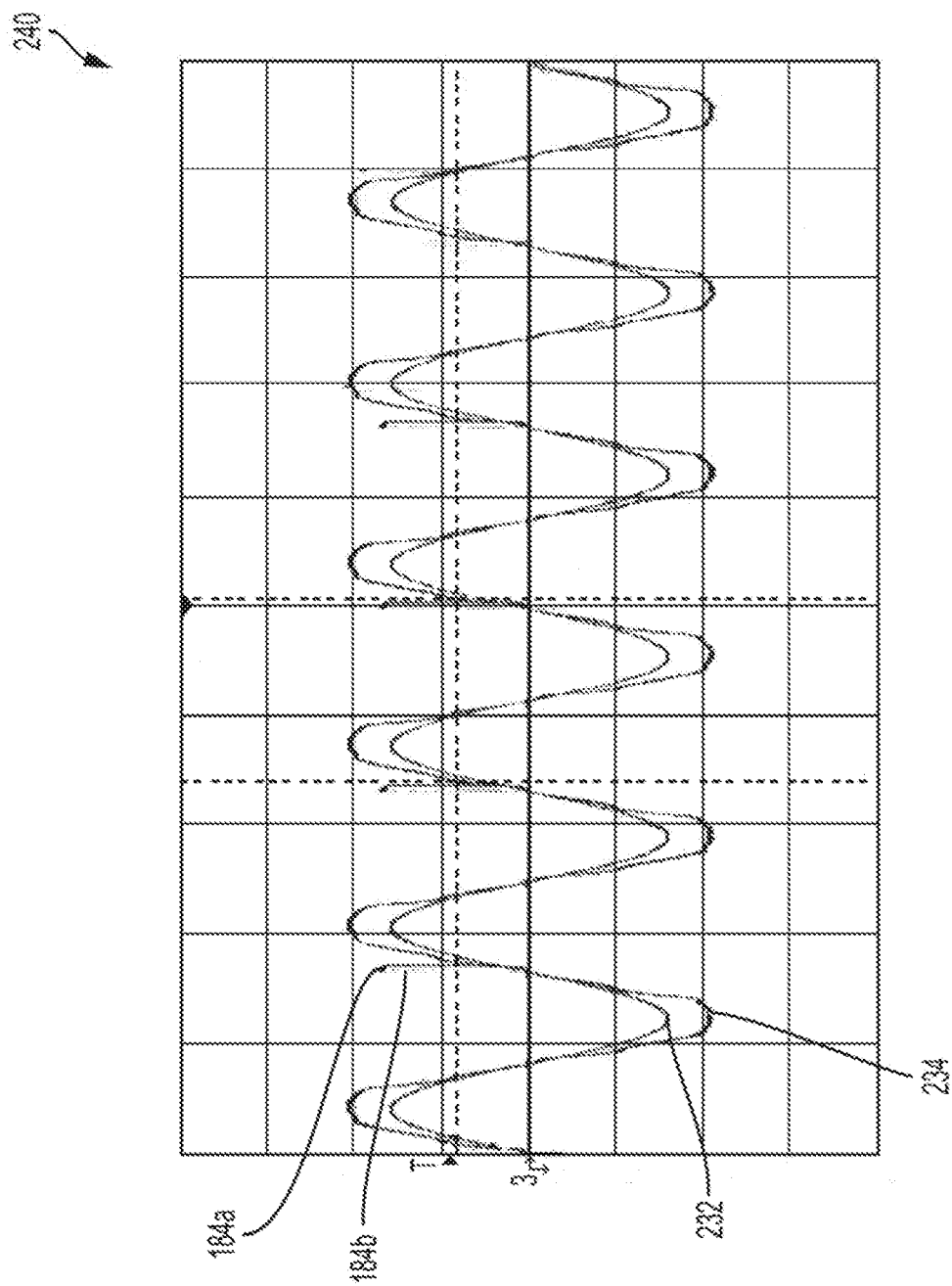
FIG. 7 is a waveform capture showing one example of the grid signal, the output current of the inverter system of FIG. 2, and pulse signals demodulated at the inverter modules of the inverter system of FIG. 2.
Figure 8:
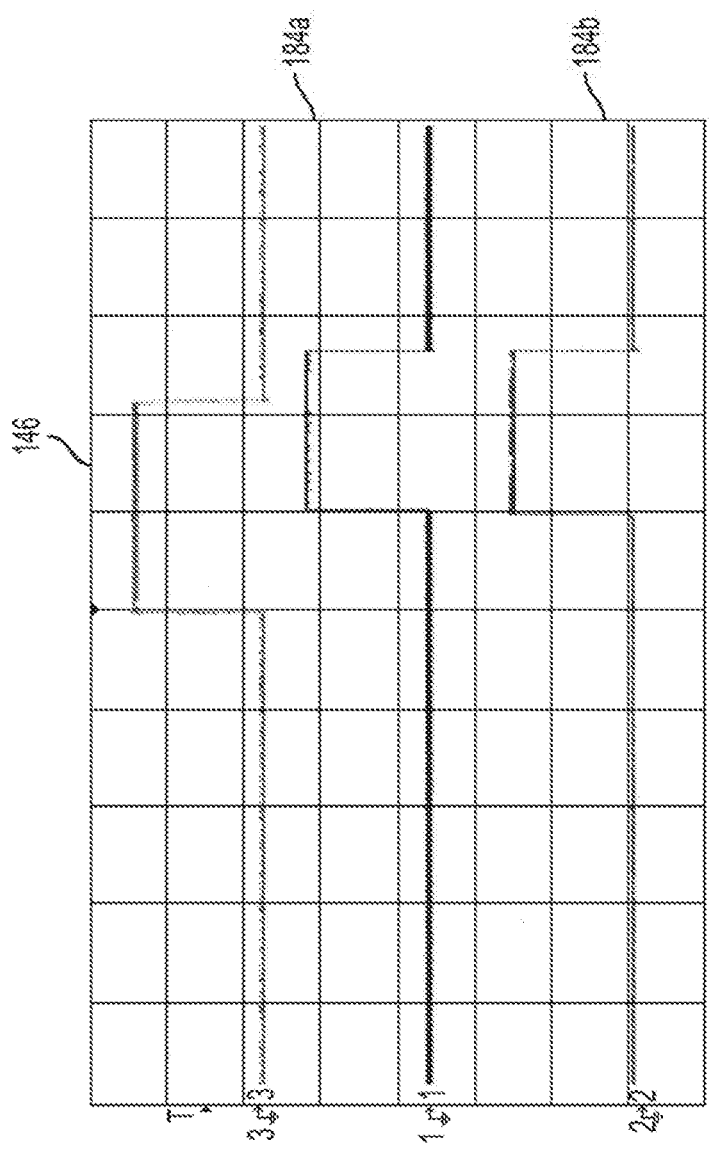
FIGS. 8 and 9 are diagrams showing one example of the pulse signals of FIG. 7 along with the pulse signal from the synchronization circuit of FIGS. 2 and 3.
Figure 9:
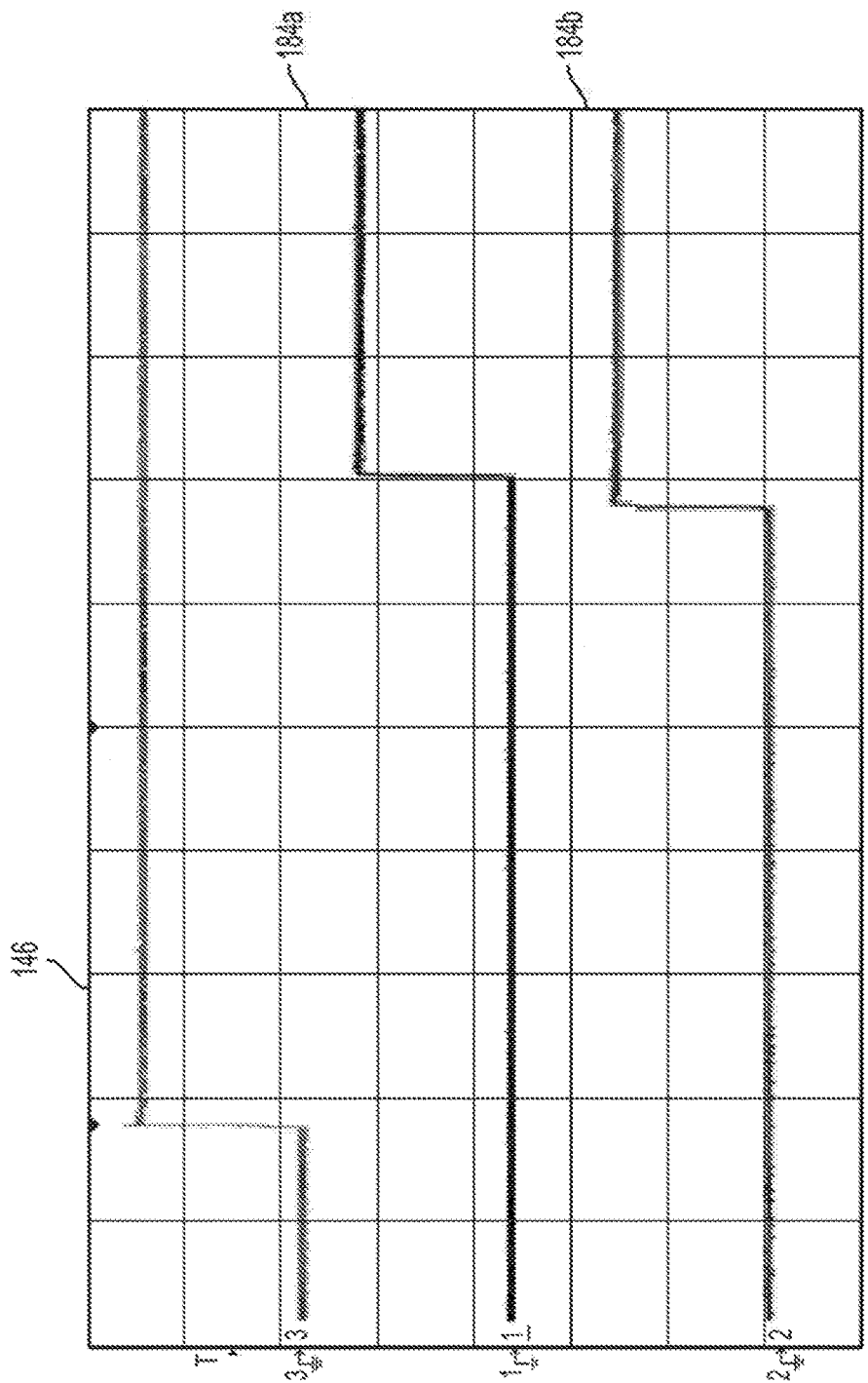

FIG. 7 is a diagram 240 showing one example of the voltage 232 of the grid signal 130, the current 234 of the output 20 of the inverter system 100, and reproduced pulse signals 184a, 184b demodulated at the modules 2a, 2b of the inverter system 100 of FIG. 2. As shown, the current 130 and the voltage 232 are substantially in-phase. The reproduced pulse signals 184a, 184b, as shown in FIG. 7, are also substantially in-phase. FIGS. 8 and 9 are diagrams showing one example of the reproduced pulse signals 184a, 184b along with the pulse signal 146 from the synchronization circuit 24. As illustrated, the phase of the reproduced pulse signal 184a is slightly offset from the pulse signal 146. The reproduced pulse signal 184b is also offset from the pulse signal 146 and the reproduced pulse signal 184b by an additional amount.

As illustrated in the diagram 240, in various examples, one or more of the demodulation circuits 28a, 28b, 28n may be programmed to insert a phase shift between the phase of the pulse signal 146 and the phase of the respective reproduced pulse signals 184a, 184b, etc. In some examples, all demodulation circuits 28a, 28b, 28n may be programmed to insert the same phase shift between the pulse signal 146 and the respective reproduced pulse signals 184a, 184b, etc. For example, the phase shift may be selected to counteract a power factor on the electrical grid network 122. Also, in some example, there may be an inherent delay in the synchronization circuit 24 and the demodulation circuits 28a, 28b, 28n that may result in a baseline phase difference between the pulse signal 146 and the respective reproduced pulse signals 184a, 184b, etc. For example, passive components in the modules 2a, 2b, 2n of the inverter system 100 may lead to a slight delay in the synchronization current signal 11 at different points in the inverter system. In some examples, the total delay between the pulse signal 146 and the reproduced pulse signal 184b may be less than 75 microseconds.

Referring to FIG. 9, variance of the signals 146, 184a, 184b is shown. Total variance may be less than 10 microseconds. The variance may result from one or more of several factors. One example source of variance may come from the TTL conversion logic 172. For example, the circuits making up the TTL conversion logic 172 may utilize thresholds to distinguish between asserted and un-asserted values of the reproduced pulse signal 184. If noise is present at the input of the TTL conversion logic 172, it may impact the pulse timing. Also, in some examples, there may be some variation in when the grid signal 130 actually crosses zero back at the termination box 23.

FIGS. 10-14 are diagrams showing example of a circuit configuration for an inverter module that may be used, for example, as one or more of the modules 2a, 2b, 2n, etc. The inverter module 350 shown in FIG. 10 comprises a DC source 352. Four switches 354-1, 354-2, 354-3 are shown along with passive components including an inductor 356 and a capacitor 358. The four switches 354-1, 354-2, 354-3, 354-4 may be operated in an independent or complimentary manner dependent upon the switching controller configuration. For example, the switches 354-1, 354-2, 354-3, 354-4 may be switched according to unipolar or bipolar switching configurations. An output 360 of the inverter module 350 may be present across the capacitor 358. FIG. 11 shows an inverter module 364 that can be included as an inverter module in an inverter system. For example, the DC terminal of inverter 364 may be connected to a photovoltaic (PV) panel to receive an output from the photovoltaic panel (or other suitable DC source). FIGS. 12 and 13 show inverter modules 366 and 368, respectively, that may be included as inverter modules in an inverter system. FIG. 14 illustrates another example inverter module 370 that can be included in one or more string members. In some examples, the inverter modules 364, 366, 368, 370 may include additional components and/or circuits that are not illustrated for simplicity purposes.

Figure 15:
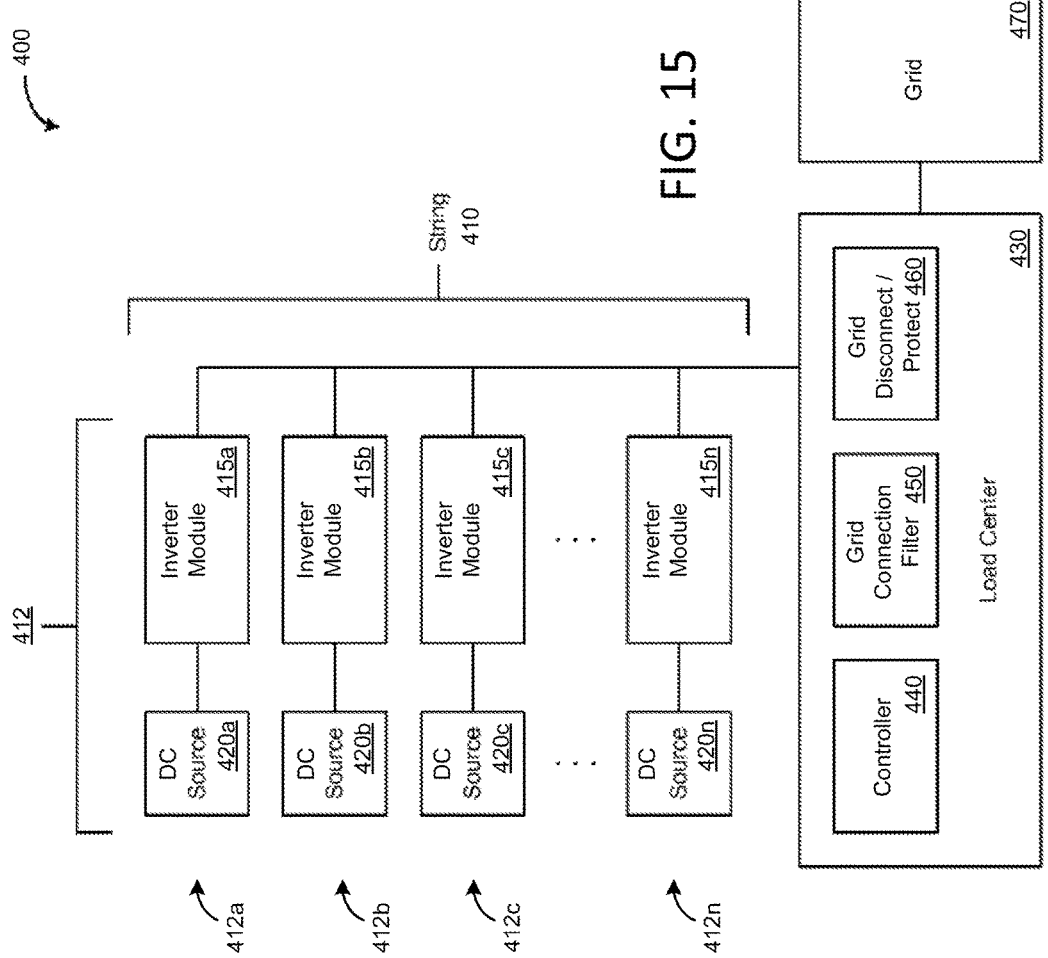
FIG. 15 shows one example of an inverter system that may be operated with the synchronization systems and methods described herein.

FIG. 15 shows one example of an inverter system 400 that may be operated with the synchronization systems and methods described herein. In some examples, the system 400 includes one or more strings 410 and a central load center 430. The load center 430 may be similar to the termination box 23 described in FIG. 1 above. The load center 430 may include an interface to couple to a stand-alone power system, an AC motor drive, electrical grid 470, and/or other AC resistive loads. For simplicity purposes, only one string 410 is illustrated in FIG. 15, although multiple strings 410 could be coupled to the load center 430 in some examples. Each string 410 may includes a plurality of string members 412a, 412b, 412c, 412n. Respective string members 412a, 412b, 412c, 412n may comprise inverter modules 415a, 415b, 415c, 415n, as described herein, coupled to respective DC sources 420a, 420b, 420c, 420n. Inverter modules 415a, 415b, 415c, 415n may be electrically coupled to one another in series as shown. For example, each string 410 may be configured in a manner similar to the modules 2a, 2b, 2n of FIGS. 2-3.

Referring back to FIG. 15, inverter modules 415a, 415b, 415c, 415n of a string 410 may be operated with phase-offset switch control signals, as described herein. In one example, the inverter system 400 may include ten string members 412 as part of a string 410. The string members 412 may be connected in series with each voltage source being a photovoltaic panel for generating energy from sunlight. The inverter system 400 may be used to convert DC energy into AC energy at the photovoltaic panel level (e.g., at each string member 112) in a single stage conversion, and sum the voltage that is output from each string member 412 on the string 410 in order to couple to the electrical grid 470.

In some examples, the inverter system 400 also includes one or more controllers 440, one or more grid connection filters 450, and one or more grid disconnect/protects 460 that can be incorporated as part of the load center 430. In other embodiments, the controllers 440, the grid connection filters 450, and/or the grid disconnect/protects 460 can be provided separately from the load center 430. The controller 440 may communicate with individual inverter modules 415a, 415b, 415c, 415n in order to coordinate the outputs of each string member 412 to achieve the desired power and overall energy based on the performance or operation of each string member 412. For example, the controller 440 may provide individual control signals to each of the individual inverter modules 415a, 415b, 415c, 415n to dynamically control the conversion at each string member 412. In some examples, the controller 440 may provide each inverter module 415a, 415b, 415c, 415n with a synchronization signal, as described herein. Also, in some examples, the controller 440 may provide one or more of the inverter modules 415a, 415b, 415c, 415n with a phase offset multiplier and/or phase offset for its respective switch control signal, as described herein. In some examples, the inverter system 400 may comprise individual string controllers (e.g., multiple controllers 440 resident inside or outside of the string, so that each string 410 has a corresponding controller 440). The individual string controllers may be connected to one another in parallel, and/or in series. In other embodiments, the controller 440 may be provided for multiple strings 410 based on the available controller 440 bandwidth for computation and communication. In examples with multiple string controllers, each string controller may or may not communicate directly with one another. In such cases, the plurality of string controllers may also communicate with a master controller 440.

Based on the control signals provided by the controller 440, each of the one or more strings 410 can be caused to generate a certain AC output having a certain phase to the load center 430. The output from a string 410 (e.g., from the combined output of individual string members 412a, 412b, 412c, 412n) can be provided to a respective grid connection filter 450, which can then be connected to a respective grid disconnect/protect 460. In some examples, multiple strings 110 can be coupled to a single grid connection filter 450 and/or a single grid disconnect/protect 460. The grid connection filter 450 can be coupled to the string 410 to provide an interface for providing the output from the string 410 (e.g., sum of the voltage and/or current) to an existing electrical grid 470 (e.g., the sum of the current that is outputted from individual string members 412 can pass through the grid connection filter 450). In some examples, the load center 430 can provide an interface for providing the output from the strings 410 to one of a stand-alone power system, AC motor drives, and/or AC resistive loads (e.g., instead of coupling the strings 410 to the grid 470).

In some embodiments, the grid connection filter 450 may be coupled to the grid disconnect/protect 460. The grid disconnect/protect 460 can provide protection for the inverter system 400 during instances of grid fault and/or low or high PV conditions. During these faulty conditions, the controller 440 may cause a break in the circuit via the grid disconnect/protect 460 for protecting the system 400. (For example, the grid disconnect/protect 460 may operate similarly to a breaker.) In some examples, disconnect/protection control mechanism can be independent of the string controller(s) 440 and may be resident inside the grid disconnect/protect block 460. For example, the load center 430 can be at least a part of a termination box or circuit breaker of a residence or commercial building. The grid disconnect/protect 460 can include one or more grid disconnect switches (and one or more inductors) that can be controlled by the controller 440 or separately by its own disconnect/protect controller inside the grid disconnect/protect 460 during a grid fault and/or low or high PV conditions. By controlling the outputs of individual string members 412 in a string 410, as described herein, the inverter system 400 may improve and enhance the performance of collecting and converting energy for a variety of different uses.

Figure 16:
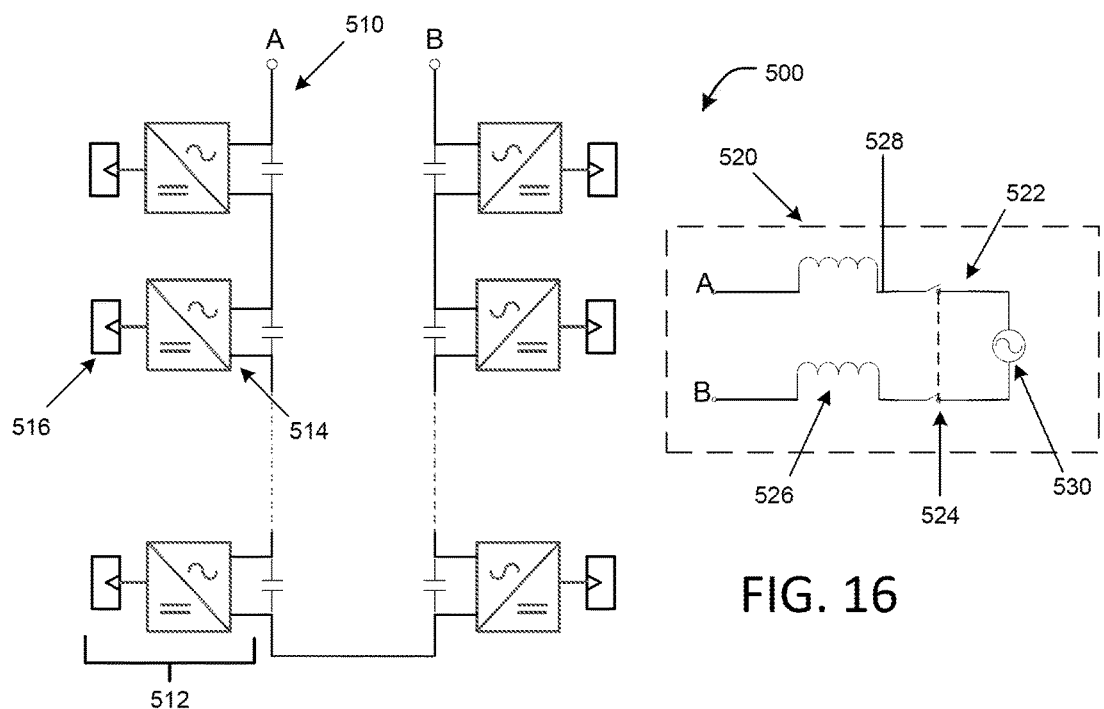
FIGS. 16-17 illustrate additional examples of inverter systems that may be operated with phase-offset switch control signals, as described herein.
Figure 17:
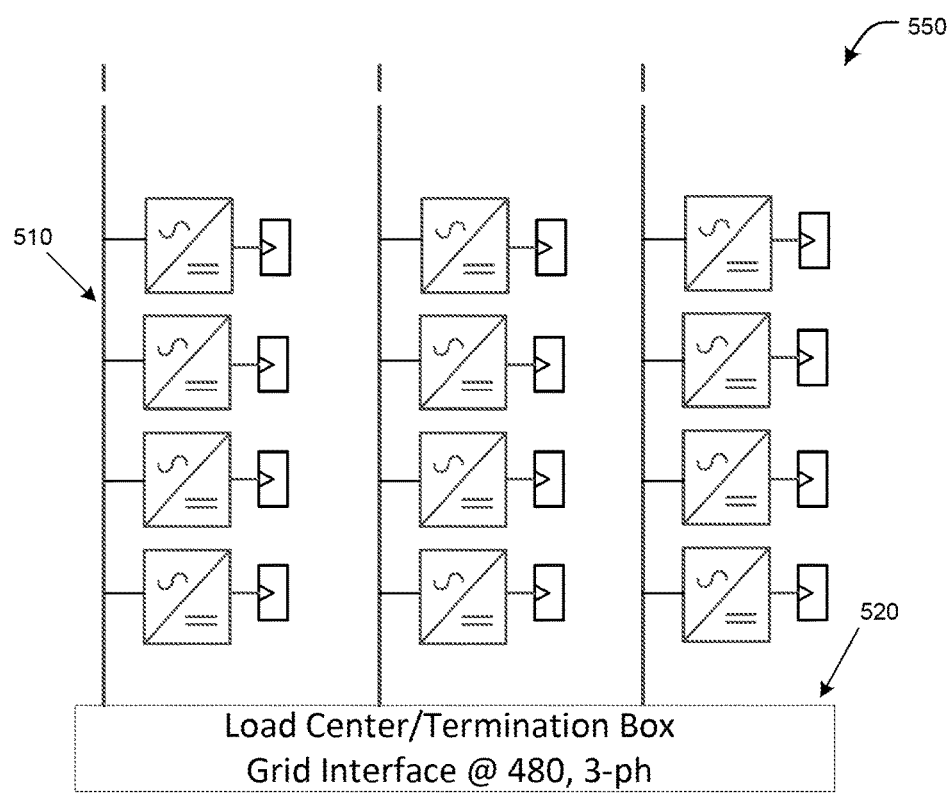

FIGS. 16-17 illustrate additional examples of inverter systems that may be operated with phase-offset switch control signals, as described herein. The systems such as described with respect to FIGS. 16-17 may be implemented, for example, with components described with respect to FIGS. 1-15. FIG. 16 shows an inverter system 500 that comprises a string 510 coupled to a central load center or termination box 520. Additional strings 510 may be coupled to the load center 520, but are not illustrated in FIG. 16 for simplicity (e.g., the load center 520 may be coupled to one, two, three, four, twenty, thirty, fifty or more, etc., strings 510). The strings 510 can be coupled to the load center 520 in parallel, in series, or in any combination thereof.

Each string 510 includes one or more string members 512 that are coupled to each other in series. In some examples, each string member 512 include an inverter module 514 that is coupled to a DC source 516, (e.g., a photovoltaic panel). The DC source 516 may provide a DC output to the inverter module 514, so that each string member 512 can provide an AC output to the string 510. Each string member 512 may output a low-voltage, which can include any of the voltage values as described in this application. The inverter modules 512 making up any given string 510 may utilize phase-offset switch control signals to increase the effective switching frequencies of the inverter modules 512.

The inverter modules 514 shown in FIGS. 16 and 17, for example, may be configured for a single phase power system or for multiple-phase power systems. For example, the inverter modules 514 of FIG. 17 may be configured for a three-phase power system. For implementing three phase converter system examples, the configuration of the string 510 and the string members 412 may include additional components, such as more switches and/or magnetic components, and can utilize a particular wiring arrangement. For simplicity purposes, a single-phase implementation is discussed in the application.

In some embodiments, a single load center 520 can be provided for the inverter system 500. Alternatively, a plurality of load centers 430 may be provided. In examples with a plurality of load centers 430, the load centers 430 may be connected to each other in parallel, in series, or in combination thereof. The load center 430 may include one or more circuit breakers 522, one or more grid disconnect switches 524, and one or more magnetic components 526 (e.g., one or more inductors). In some instances, the load center 520 can include or be part of a switchgear, and one, two, or more inductors along the switchgear can be used as passive power components. The load center 520 can also include a controller (or alternatively, multiple controllers, such as one controller per string 410) that can provide commands for controlling the combined AC output of the string 510 and/or the individual AC outputs of the individual string members 512. In some examples, the controller can provide, for example, control signals 528 for controlling the power factor (PF) of the inverter system 500 and/or for controlling the maximum power point tracking (MPPT) of the inverter system 500. During instances of grid fault and/or low or high PV conditions, the controller may be programmed to cause a break between the inverter system 500 and the electrical grid 530 or other load utilizing one or more disconnect switches 524.

The load center 520 can also interface the inverter system 500 to an existing electrical grid 530 or other suitable load. In various examples, the electrical grid 530 can be configured for a single phase power system or for a three-phase power system. By controlling the string 510 and the individual string members 512, the load center 430 can enable the system 300 to have grid compatibility and connectivity. In some examples, the load center 520 may also provide inverter modules 514 of the string members 510 with a synchronization signal that may be utilized to implement phase offsets between switch control signals of the inverter modules 514. Also, in some examples, the load center 520 may provide one or more of the inverter modules 514 with a phase offset multiplier and/or phase offset for its respective switch control signal, as described herein.

FIG. 17 shows one example of an inverter system 550 that includes three or more strings 510 that are coupled to a central load center or termination box 520. In the example shown in FIG. 17, the load center 520 includes a grid interface for interfacing the inverter system 550 to an existing 480 V, three-phase electrical grid (not shown in FIG. 17). Depending on various implementations, the load center 520 can include individual string controllers for each of the three strings 510 and/or include a consolidated string controller for multiple strings based on available controller bandwidth for computation and communication. For simplicity purposes, the three strings 510 illustrated are representative of the three single-phase strings to constitute a three-phase power system, but some examples could include additional strings and/or configurations for implementing a three-phase system 550. In some examples, the system 550 can include a plurality of load centers 520. In these examples, the plurality of load centers 520 can be connected to each other in parallel, in series, or in combination thereof. Additional examples of inverter systems that may be operated with phase-offset switch control signals, as described herein, are found in U.S. Patent Application Publication No. 2013/0181527 entitled "Systems and Methods for Solar Photovoltaic Energy Collection and Conversion," which is incorporated herein by reference in its entirety.

Although various systems described herein may be embodied in software or code executed by one or more microprocessors as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The methods described herein show the functionality and operation of various implementations. If embodied in software, each action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the actions described herein may describe a specific order of execution, it is understood that the order of execution may differ from that which is described. For example, the order of execution of two or more actions may be scrambled relative to the order described. Also, two or more actions may be executed concurrently or with partial concurrence. Further, in some embodiments, one or more of the actions may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A direct current (DC) to alternating current (AC) inverter system, comprising:
   a synchronization control circuit configured to:
      receive a grid signal from an electrical grid, the grid signal having a grid signal frequency;
      detect a zero-crossing of the grid signal;
      generate a pulse signal, wherein a first pulse of the pulse signal corresponds to the zero-crossing of the grid signal;
      modulate the pulse signal onto a carrier signal to generate a synchronization current signal, wherein the carrier signal has a synchronization current signal frequency that is higher than the grid signal frequency;
      add, by an isolated aggregation current mode transformer, the synchronization current signal to an output current of the inverter system to generate an aggregated output current in order to introduce current onto the electrical grid;
   a first inverter module configured to receive a first DC input from a first DC source and provide a first AC output voltage at a first output, the first inverter module comprising:
      a first switch electrically coupled between the first DC source and the first output;
      a first isolated current-mode transformer electrically coupled to sense the aggregated output current;
      a first module control circuit configured to:
         detect the aggregated output current from the first isolated current-mode transformer of a first demodulation circuit;
         demodulate the synchronization current signal to generate a first reproduced pulse signal;
         include a phase shift to the first reproduced pulse signal to compensate for a baseline phase difference; and
         generate a first switch control signal based at least in part on the first reproduced pulse signal;
   a second inverter module configured to receive a second DC input from a second DC source and provide a second AC output voltage at a second output, wherein the first inverter module and the second inverter module are electrically coupled in series, and wherein an AC output voltage of the inverter system comprises a sum of the first AC output voltage and the second AC output voltage, the second inverter module comprising:
      a second switch electrically coupled between the second DC source and the second output;
      a second isolated current-mode transformer electrically coupled to the electrical grid;
      a second module control circuit configured to:
         detect the aggregated output current from the second isolated current-mode transformer of a second demodulation circuit;
         demodulate the synchronization current signal to generate a second reproduced pulse signal;
         include the phase shift to the second reproduced pulse signal to compensate for the baseline phase difference; and
         generate a second switch control signal based at least in part on the second reproduced pulse signal.

2. The system of claim 1, wherein the synchronization current signal frequency is at least ten times higher than the grid signal frequency.

3. The system of claim 1, wherein the grid signal is a voltage on the electrical grid.

4. The system of claim 1, wherein the synchronization control circuit is further configured to:
   determine a first amplitude of a current introduced onto the electrical grid by the system;
   determine a second amplitude of the current introduced onto the electrical grid, wherein the second amplitude is greater than the first amplitude; and
   increase an amplitude of the synchronization current signal.

5. The system of claim 1, wherein the first module control circuit is further configured to:
   detect a first amplitude of the synchronization current signal;
   detect a second amplitude of the synchronization current signal, where the second amplitude is lower than the first amplitude; and
   increase a gain of an amplifier applied to the synchronization current signal.

6. The system of claim 1, wherein the synchronization control circuit comprises a monitoring circuit electrically coupled to receive the grid signal, wherein an output of the monitoring circuit is the pulse signal.

7. The system of claim 1, wherein the synchronization control circuit comprises at least one processor programmed to receive the grid signal from the electrical grid; detect the zero-crossing of the grid signal; generate the pulse signal; and modulate the pulse signal onto the carrier signal.

8. The system of claim 1, further comprising a plurality of inverter modules, the plurality of inverter modules comprising the first inverter module and the second inverter module, wherein the synchronization control circuit is electrically connected in parallel with the plurality of inverter modules.

9. The system of claim 1, wherein the first module control circuit is further configured to generate the first switch control signal substantially in phase or in some predetermined relationship with the first reproduced pulse signal.

10. The system of claim 1, wherein the grid signal comprises at least one of: a current of the electrical grid, a voltage of the electrical grid, a combination of harmonics contained within the voltage of the electrical grid, and a combination of harmonics contained within the current of the electrical grid.

11. A converter system, comprising:
a synchronization control circuit configured to:
modulate a reference signal onto a carrier signal to generate a synchronization current signal;
add, by an isolated aggregation current mode transformer, the synchronization current signal to an output current of the converter system to generate an aggregated output current in order to introduce current onto the electrical grid; and
a first converter module configured to receive a first direct current (DC) input from a first DC source and provide a first output voltage at a first output, the first converter module comprising:
a first switch;
a first current sensor of a first demodulator; and
a first module control circuit configured to:
receive the aggregated output current from the first current sensor;
generate a first reproduced reference signal, at least in part from the aggregated output current;
include a phase shift to the first reproduced pulse signal to compensate for a baseline phase difference; and
generate a first switch control signal based at least in part on the first reproduced reference signal;
a second converter module configured to receive a second DC input from a second DC source and provide a second output voltage at a second output, wherein the first converter module and the second converter module are electrically coupled in series and wherein an output voltage of the converter system comprises a sum of the first output voltage and the second output voltage, the second converter module comprising:
a second switch;
a second current sensor of a second demodulator; and
a second module control circuit configured to:
receive the aggregated output current from the second current sensor;
generate a second reproduced reference signal, at least in part from the aggregated output current;
include the phase shift to the second reproduced pulse signal to compensate for the baseline phase difference; and
generate a second switch control signal based at least in part on the reference signal.

12. The system of claim 11, wherein the synchronization control circuit further comprises a monitoring circuit electrically connected to receive a grid signal and output the reference signal, wherein the reference signal comprises a first pulse that is at a first zero-crossing of the reference signal.

13. The system of claim 12, wherein the grid signal comprises at least one of: a voltage of an electrical grid, a current of the electrical grid, a harmonic of the voltage of the electrical grid, and a harmonic of the current of the electrical grid.

14. The system of claim 11, wherein the first module control circuit is further configured to generate the first switch control signal substantially in phase or in some predetermined relationship with the first reproduced reference signal.

15. The system of claim 11, wherein the synchronization control circuit is further configured to:

detect a first value for the output current at a first time;
detect a second value for the output current at a second time after the first time, wherein the second value for the output current is higher than the first value for the output current; and
increase an amplitude of the synchronization current signal.

16. The system of claim 11, wherein the first module control circuit comprises at least one filter to extract the synchronization current signal from the aggregated output current.

17. The system of claim 11, wherein the first module control circuit further comprises the first demodulator to generate the first reproduced reference signal.

18. The system of claim 11, further comprising a plurality of converter modules, the plurality of converter modules comprising the first converter module and the second converter module, wherein the synchronization control circuit is electrically connected in parallel with the plurality of converter modules.

19. A series-connected converter system comprising:
a synchronization control circuit, comprising:
a monitoring circuit configured to receive an input signal and output a pulse signal, wherein a first pulse of the pulse signal corresponds to a first zero-crossing of the input signal;
a modulator configured to generate a synchronization signal based at least in part on the pulse signal;
an isolated aggregation current mode transformer comprising a first coil electrically coupled to receive the synchronization signal and a second coil electrically coupled to an output current of the converter system to add a synchronization current signal to the output current to generate an aggregated output current in order to introduce current onto the electrical grid;
a first converter module electrically coupled between a first direct current (DC) source and a first output, the first converter module comprising:
a first switch;
a first current sensor positioned to sense the aggregated output current of the converter system, wherein the aggregated output current is a sum of the output current of the converter system and the synchronization current signal, wherein the synchronization current signal is proportional to the synchronization signal;
a first demodulator in communication with the first current sensor to generate a first reproduced pulse signal, at least in part from the aggregated output current, wherein the first demodulator is configured to include a phase shift to the first reproduced pulse signal to compensate for a baseline phase difference; and
a first module control circuit configured to generate a first switch control signal based at least in part on the first reproduced pulse signal; and
a second converter module electrically coupled between a second DC source and a second output, the second converter module comprising:
a second switch;
a second current sensor positioned to sense the aggregated output current of the converter system;
a second demodulator in communication with the second current sensor to generate a second reproduced pulse signal, at least in part from the aggregated output current wherein the second demodulator is configured to include the phase shift to the second reproduced pulse signal to compensate for the baseline phase difference; and a second module control circuit configured to generate a second switch control signal based at least in part on the second reproduced pulse signal, wherein the first converter module and the second converter module are electrically coupled in series, and wherein an output voltage of the converter system comprises a sum of a first output voltage at the first output and a second output voltage a second output voltage at the second output.

20. The system of claim 19, wherein the first module control circuit is further configured to generate the first switch control signal substantially in phase or in some predetermined relationship with the first reproduced pulse signal.

21. The system of claim 19, wherein the synchronization control circuit further comprises at least one processor programmed to:

detect a first value for the output current of the converter at a first time;

detect a second value for the output current of the converter at a second time after the first time, wherein the second value for the output current is higher than the first value for the output current; and increase a gain of an amplifier applied to the synchronization signal.

22. The system of claim 19, wherein the first module control circuit is further configured to:

detect a first amplitude of the synchronization current signal;

detect a second amplitude of the synchronization current signal, where the second amplitude is lower than the first amplitude;

extract a reproduced synchronization signal from the aggregated output current; and increase a gain of an amplifier applied to the reproduced synchronization signal.

* * * * *